(12) United States Patent
Kozber et al.

(10) Patent No.: US 12,229,484 B1
(45) Date of Patent: Feb. 18, 2025

(54) TIMING PATH ANALYSIS USING FLOW GRAPHS

(71) Applicant: Synopsys, Inc., Sunnyvale, CA (US)

(72) Inventors: Oliver Kozber, Beaverton, OR (US); Colin Williams, Cary, NC (US)

(73) Assignee: SYNOPSYS, INC., Sunnyvale, CA (US)

( * ) Notice: Subject to any disclaimer, the term of this patent is extended or adjusted under 35 U.S.C. 154(b) by 524 days.

(21) Appl. No.: 17/535,040

(22) Filed: Nov. 24, 2021

Related U.S. Application Data

(60) Provisional application No. 63/117,703, filed on Nov. 24, 2020.

(51) Int. Cl.
*G06F 30/3312* (2020.01)
*G06F 3/04842* (2022.01)
*G06F 30/31* (2020.01)
*G06F 119/12* (2020.01)

(52) U.S. Cl.
CPC ...... *G06F 30/3312* (2020.01); *G06F 3/04842* (2013.01); *G06F 30/31* (2020.01); *G06F 2119/12* (2020.01)

(58) Field of Classification Search
CPC .. G06F 30/3312; G06F 3/04842; G06F 30/31; G06F 2119/12
See application file for complete search history.

(56) References Cited

U.S. PATENT DOCUMENTS

| | | | | |
|---|---|---|---|---|
| 7,784,008 B1* | 8/2010 | Hutton | ................... | G06F 30/327 |
| | | | | 716/139 |
| 7,793,249 B1* | 9/2010 | Wadland | ............... | G06F 30/394 |
| | | | | 716/139 |
| 7,802,221 B1* | 9/2010 | Brink | ...................... | G06F 30/30 |
| | | | | 716/139 |
| 8,060,849 B2* | 11/2011 | He | ......................... | G06F 30/394 |
| | | | | 716/112 |
| 8,504,978 B1* | 8/2013 | Bhardwaj | ............ | G06F 30/367 |
| | | | | 716/108 |
| 8,793,643 B2* | 7/2014 | Nishio | ................... | G06F 30/394 |
| | | | | 716/137 |
| 8,898,608 B1* | 11/2014 | Chuang | ................. | G06F 30/392 |
| | | | | 716/139 |
| 10,037,394 B1* | 7/2018 | Kulshreshtha | .......... | G06F 30/30 |
| 10,366,201 B1* | 7/2019 | Ng | ......................... | G06F 30/327 |
| 10,643,019 B1* | 5/2020 | Han | ....................... | G06F 30/398 |
| 10,776,547 B1* | 9/2020 | Gupta | ................. | G06F 16/9024 |
| 10,783,300 B1* | 9/2020 | Singh | .................. | G06F 30/3315 |
| 10,783,312 B1* | 9/2020 | Ginetti | .................. | G06F 30/398 |
| 10,831,971 B1* | 11/2020 | Quay | ..................... | G06F 30/337 |
| 10,860,757 B1* | 12/2020 | Li | ............................ | G06F 30/30 |

(Continued)

*Primary Examiner* — Nha T Nguyen
(74) *Attorney, Agent, or Firm* — Womble Bond Dickinson (US) LLP (57) ABSTRACT

A method for timing path analysis using flow graphs. The method includes receiving timing data associated with an integrated circuit (IC) design. The timing data includes a plurality of timing paths. The method also includes generating a graphical representation of the plurality of timing paths. A timing path is represented as a flow ribbon across one or more components of the IC design. A display attribute of the flow ribbon is indicative of a metric of the timing path. The graphical representation is provided in a graphical user interface (GUI) to a user.

19 Claims, 6 Drawing Sheets

(56) References Cited

U.S. PATENT DOCUMENTS

| | | | | |
|---|---|---|---|---|
| 2011/0131544 A1* | 6/2011 | Majumder | ............. | G06F 30/17 |
| | | | | 716/139 |
| 2011/0185335 A1* | 7/2011 | Oh | ....................... | G06F 30/327 |
| | | | | 716/108 |
| 2016/0018979 A1* | 1/2016 | Sunder | .................... | G06T 17/10 |
| | | | | 715/771 |

* cited by examiner

TIMING PATH ANALYSIS USING FLOW GRAPHS

CROSS-REFERENCE TO RELATED APPLICATIONS

The present application claims the benefit under 35 U.S.C. § 119 (e) of U.S. Provisional Patent Application No. 63/117,703 filed on Nov. 24, 2020, which is incorporated herein by reference in its entirety for all purposes.

TECHNICAL FIELD

The present disclosure relates to electronic design automation. In particular, the present disclosure relates to timing path analysis using flow graphs.

BACKGROUND

Timing analysis can be performed on a design after placement of components on a chip to determine signal delays between logic elements. Timing analysis results can be expressed in terms of slack. The slack may be a difference between a desired delay and an actual delay. The timing analysis results may include worst negative slack (WNS), total negative slack (TNS), number of violating paths (NVP) or give the WNS for each endpoint.

SUMMARY

In one aspect, a method includes receiving timing data associated with an integrated circuit (IC) design. The timing data includes a plurality of timing paths. The method also includes generating a graphical representation of the plurality of timing paths. A timing path is represented as a flow ribbon across one or more components of the IC design. A display attribute of the flow ribbon is indicative of a metric of the timing path. The graphical representation is provided in a graphical user interface (GUI) to a user.

In one aspect, a system includes a memory storing instructions and a processor, coupled with the memory and to execute the instructions. The instructions when executed cause the processor to receive timing data associated with an integrated circuit (IC) design, generate a graphical representation of the plurality of timing paths, and provide the graphical representation in a graphical user interface (GUI) to a user. The timing data includes a plurality of timing paths. A timing path is represented as a graphical object across one or more components of the IC design and a display attribute of the graphical object is indicative of a metric of the timing path.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to timing path analysis using flow graphs. A timing flow graph may be generated based on timing data associated with a circuit design (e.g., an integrated circuit (IC) design). The timing flow graph may represent a timing path as a flow ribbon across one or more components of the IC design. A component may refer to a cell, a node, a block, or a module. The timing flow graph may be analyzed to determine a source and/or an owner of an issue in a timing path. In some aspects, the timing path may represent a list of pins. Each pin may be an input or an output from a component. In addition, the timing flow graph may be used to detect unexpected connections and to identify hotspots.

Users may have long lists of violating timing paths (i.e., timing paths that violate one or more design rules) and may desire to analyze each violating timing path to determine the root or cause of the violation. Full enumeration may not be feasible and analysis is very difficult due to the large amounts of timing data (e.g., large number of timing paths). Users struggle to determine where the roots of the timing violation are. For example, the users struggle to analyze the large amounts of data associated with violating timing paths to find patterns in the data that point to specific problems.

Conventional analysis techniques group the data by scenario, path-group, and the like. Some analysis techniques may aggregate with worst negative slack (WNS), total negative slack (TNS), number of violating paths (NVP) or give the WNS for each endpoint. These analysis techniques lose the data flow nature of the timing paths. Timing path may represent signal propagation through the one or more modules of the IC design. The module may be a high level module. Conventional analysis techniques do not show the timing paths with respect to the module or levels. The user cannot relate a metric associated with the timing path with the modules associated with the timing and with the order of the modules (e.g., level). Thus, debugging may require dropping down into all of the details of the timing paths that is time consuming.

Embodiments disclosed herein solve problems encountered in debugging and detecting root causes of violating paths. In particular, embodiments disclosed herein preserve the data flow nature of timing paths. The relation between the signal propagation between the modules and the corresponding timing paths is preserved. In addition, the relation between the timing paths and the order and/or level of the modules is preserved. Preserving the data flow nature of the timing paths helps in detecting the root of the violating path (e.g., a module).

The timing path flow graph described herein is a graphical representation of timing paths in the circuit. The graphical representation may be displayed in a user interface. The user interface (e.g., graphical user interface (GUI)) allows users to analyze issues in a large number of violating paths. The graphical representation may include modules associated with a timing path. The timing path flow graph may be a connectivity plot that displays all violating timing paths or timing paths of a particular module in a connectivity plot. The connectivity plot shows the modules and connectivity of an unfolded timing path by connection levels. The timing path flow graph can be global or for an individual module (i.e., module specific). The modules may be designed by separate engineers/groups.

Advantages of the present disclosure include, but are not limited to, providing efficient analysis of timing data, providing a visualization of a large number of timing paths, and reducing debugging time. In some aspects, the debugging time may be reduced because the user may locate the root of the violation using the timing flow graph without going through a massive amount of data associated of individual timing paths. For example, the user may identify from the timing flow graph the module that may be root of the violation (e.g., when all timing paths through the module appear to exceed a timing metric). The timing data may be analyzed efficiently by providing visibility of the timing paths and the ability for the user to analyze a high-level picture that includes a representation of a large number of timing paths and then turn to a more granular one as needed. Thus, the visualization of the large number of timing paths in the timing flow graph helps the user analyzes the large number of timing paths compared to the table or list of timing paths. Timing flow graph retains an overall representation of the paths, while having a flexible way to aggregate the nodes to help abstract out leaf level gates and instead focus on how the paths flow through the overall structure of the design.

In some embodiments, the graphical representation may display a plurality of metrics associated with the circuit design, for example, WNS, TNS, NVP, maximum number of gates, a number of bottleneck cells, path length, longest net, gate delay, number of levels, number of timing paths, and/or maximum path length in a group of timing paths. The graphical representation may display each metric of the plurality of metrics in response to an input from the user. Further, one or more attributes (characteristic) (e.g., color, line type, line width, fill pattern, or other display characteristics) of the displayed modules, timing paths, and/or group of timing paths based on a value of the metric.

In some embodiments, the flow graph may include violating timing paths. The flow graph shows path lengths for unrolled path, start/end/through cells, cell to cell path counts, and feedback loops by repeating the cell (unroll once) and sharing a display attribute (e.g., color).

In some embodiments, timing paths may share one or more components. Such collection of timing paths may be called an island. The timing flow graph may be used to identify connectivity "islands."

The approaches described herein support interactive query of data. For example, the interactive query of data may include displaying fan in/out of a module (e.g., node, cell, component, block) and cross selecting into design by edge (i.e., timing path) or component.

The timing flow graph may include different levels of details. The timing flow graph is flexible to allow control over the level of details provided (i.e., all logical hierarchies, only physical hierarchies, architecturally interesting blocks, and the like). This provides the advantage of helping the user to see and understand the high level dependencies/flow of the paths with a flexible amount of details. A user may push down into the full path details if desired for further analysis.

In some embodiments, a module may be at different levels on different timing paths. A user may select the module to generate a module focused flow graph.

Figure 1:
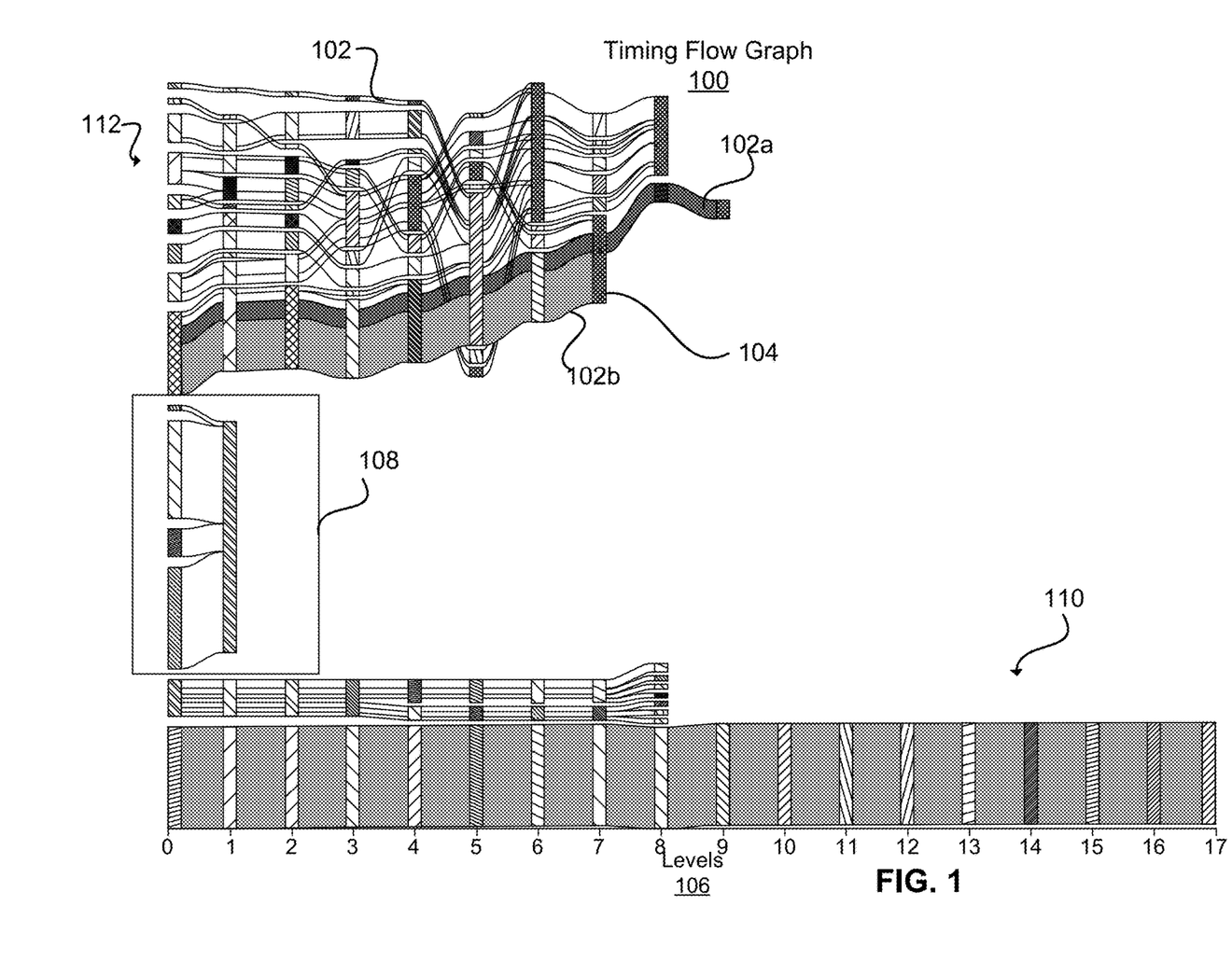
FIG. 1 is a schematic that shows a timing flow graph, in accordance with an embodiment of the present disclosure.

FIG. 1 is a schematic that shows a timing flow graph 100, in accordance with an embodiment of the present disclosure. Timing flow graph 100 includes a flow ribbon 102. Flow ribbon 102 can represent a set of one or more timing paths in the circuit design. Flow ribbon 102 may represent a series of arcs between the modules of the circuit design. Timing flow graph 100 may include one or more modules 104 between a start point and an end point of each flow ribbon 102. The one or more timing paths share the same flow through the modules. In some aspects, module 104 may represent a high level module. Thus, the one or more timing paths may not share the same leaf level gates but share the high level module. The high level module may correspond to the module where an endpoint of the one or more timing paths reside. A unique attribute (e.g., color) may be associated with each module 104. The color of module 104 may correspond with a module boundary color. For example, module 104 may be individually colored to help distinguish between them and detect duplicates. Each module 104 may be represented in one or more flow ribbons 102 because each module may be included in one or more timing paths.

In some embodiments, a first dimension 106 of the timing flow graph (e.g., x-coordinate) may correspond to a connection order in the timing path (i.e., a connection depth). For example, first dimension 106 may correspond to the order of the component in the timing path.

In some embodiments, flow ribbon 102 are ordered and connected vertically. For example, flow ribbon 102 may be displayed in a second dimension of timing flow graph 100 (e.g., y-coordinate). Flow ribbon 102 may be associated with a display attribute (e.g., colored) indicative of a timing path metric (e.g., WNS, TNS) (e.g., selected timing metric). A width of flow ribbon 102 may be indicative of a connection count or the number of timing paths associated with the flow ribbon 102. The width of flow ribbon 102 may be proportional to the connection count between two modules. The length of flow ribbon 102 may be indicative of the number of levels. For example, a length of flow ribbon 102a is greater than the length of flow ribbon 102b. Both flow ribbon 102a and flow ribbon 104b start at the same module but flow ribbon 102a goes through more modules before ending. In some aspects, the display attribute (e.g., darker gray shading) of flow ribbon 102a may indicate that for a selected timing metric, the magnitude of the metric is higher than the magnitude of the metric for flow ribbon 104b (i.e., lighter shading). In addition, the width of flow ribbon 102a is less than the width of flow ribbon 104a. This may indicate that flow ribbon 102a has fewer timing paths compared to flow ribbon 104a.

In some embodiments, a display attribute (e.g., color) of flow ribbon 102 may change as it goes from a first module to a second module to highlight/show hotspots. Thus, the user can see where the selected metric (e.g., WNS, TNS) is most intense as it goes from a module to another module in the timing path. The flow ribbon 102 may be associated with a unique identifier. The unique identifier may be used to trace the flow ribbon 102 across the flow graph 100 and align input/output edges.

In some embodiments, timing flow graph 100 may also be used to identify connection islands, e.g., island 108. The user may identify timing paths that are interconnected with each other. For example, the plurality of flow ribbons 112 are interconnected with each others. Thus, the corresponding time paths are interconnected with each other. The user may also identify simple time paths that are not interconnected with other timing paths. For example, flow ribbon 110 is not interconnected with other flow ribbons. The user may focus on the interconnected areas to determine a source of an error or a violating timing paths as the source of the error is likely to be in the highly interconnected timing paths.

In some embodiments, details associated with module 104 or flow ribbon 102 may be displayed in tooltips to minimize text noise. The user can query the details of the modules, paths, and connectivity using mouse over feedback and clicking on module or path cross selects into a design layout for further analysis. For example, a mouse over may highlight flow ribbon 102 and show a fan in/fan out. Timing flow graph 100 is connected to other tables, views, or representations. For example, a selection of module 104 or flow ribbon 102 in timing flow graph 100 highlights module 104 or the timing path associated with flow ribbon 102 in a design layout view and in a hierarchical view.

In some embodiments, a display attribute of module 104 (e.g., color) may be used in the design layout to show the boundary of the selected module. The matching modules may be colored while the remaining modules may be non-colored. In other examples, each module may have a distinct color. The same display attribute may be used to highlight corresponding data in a tabular form or hierarchy.

In some embodiments, in response to the user selecting a portion of the graphical representation, associated data are filtered and outputted in a visual and/or tabular form. In response to selecting module 104 in the timing flow graph 100, the display attribute of the same module in all other flow ribbons may be changed.

In some embodiments, a flow ribbon selection may be followed by a filter action to reduce the timing flow graph 100 to a region of interest. For example, the user may select one or more flow ribbons. The user may input one or more attributes via the GUI. Then, timing flow graph 100 is focused to the region of interest based on the one or more attributes.

In some embodiments, timing flow graph 100 may display identified modules and/or timing paths. For example, a user may select one or more modules or timing paths in a hierarchy or tabular view and the identified modules and/or timing paths are displayed in timing flow graph 100.

In some embodiments, the user may filter data represented in timing flow graph 100 using a table. The user may select one or more modules and/or metrics in the table to reduce the timing flow graph 100 to the region of interest.

In some embodiments, the user may select to display timing paths having a timing path slack value less than a user-defined amount. Alternatively or additionally, the user may indicate to view the $n^{th}$ timing path having the worst timing path slack values. Other restriction on display criteria may also be envisioned and the examples provided herein are not intended to limit the scope of the present disclosure.

In some embodiments, timing flow graph 100 may be displayed in an interface that includes one or more panes. For example, a first pane may display information associated with a query and a second pane may display information associated with a selected module/path in timing flow graph 100 (e.g., hover tooltip information). This provides the advantage of fast comparison by the user.

In some embodiments, timing flow graph 100 may be an initial view depicting the timing paths for the design. The user may select one or more modules for further analysis. A focused flow graph may show more detailed information for a selected module.

Figure 2:
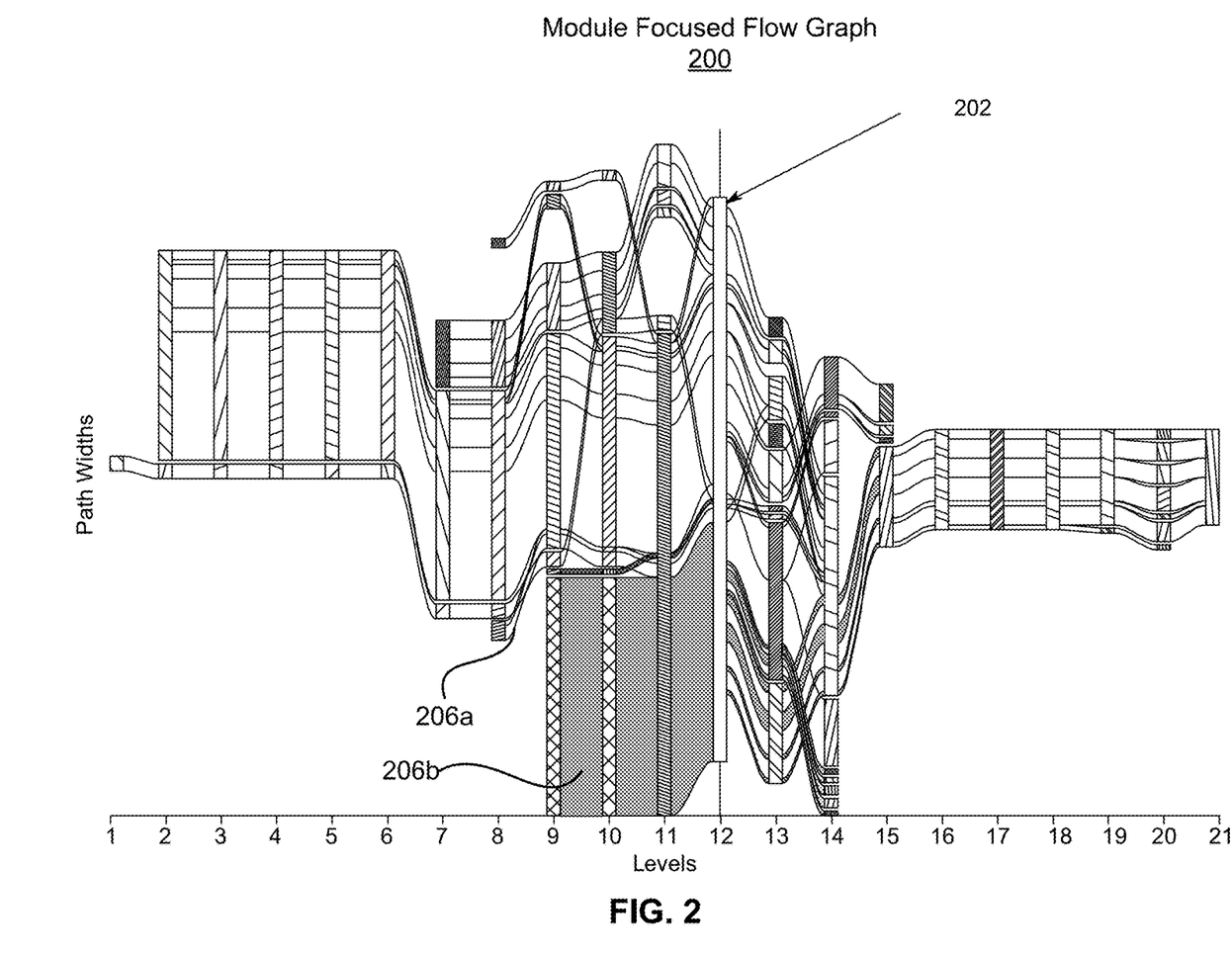
FIG. 2 is a schematic that shows a module focused flow graph, in accordance with an embodiment of the present disclosure.

FIG. 2 is a schematic that shows a module focused flow graph 200 (call centric graph), in accordance with an embodiment of the present disclosure. A common cell in multiple timing paths at different levels can be normalized in module focused flow graph 200. In response to selecting a module in timing flow graph 100, the system may generate module focused flow graph 200. Module focused flow graph 200 shows timing paths associated with the selected module. In some embodiments, module focused flow graph 200 displays a module 202 (i.e., selected module) and timing paths associated with module 202. Input and output connections of module 202 are displayed. In some aspects, module 202 is represented once in the module focused flow graph 200 and all connections to the module are shown. The timing paths are represented as flow ribbons that include all modules downstream and upstream of the selected module 202. Thus, all flow ribbons that include the selected module (focused module) at some level in their paths are represented.

In some embodiments, module 202 may be selected by clicking on a module in timing flow graph 100. Module 202 may also be selected by entering a unique identifier (e.g., number, name) in a field in the GUI.

In some embodiments, a first dimension of module focused flow graph 200 may correspond to a connection level. In some embodiments, flow ribbons associated with module 202 may not start on a left edge of module focused flow graph 200. For example, flow ribbon 206a and flow ribbon 206b can start at level 8 and level 9, respectively.

As discussed previously herein, timing flow graph 100 represents an abstraction of the data of the IC design. Bottlenecks may be displayed in timing flow graph 100 or module focused flow graph 200. In one example, module focused flow graph 200 or timing flow graph 100 may be used to identify a module and/or a timing path. Then, the layout of the IC design or a table of data associated with the IC design may be filtered based on the identified module and/or timing path. A source code (e.g., RTL) associated with the identified module may also be retrieved.

Figure 3:
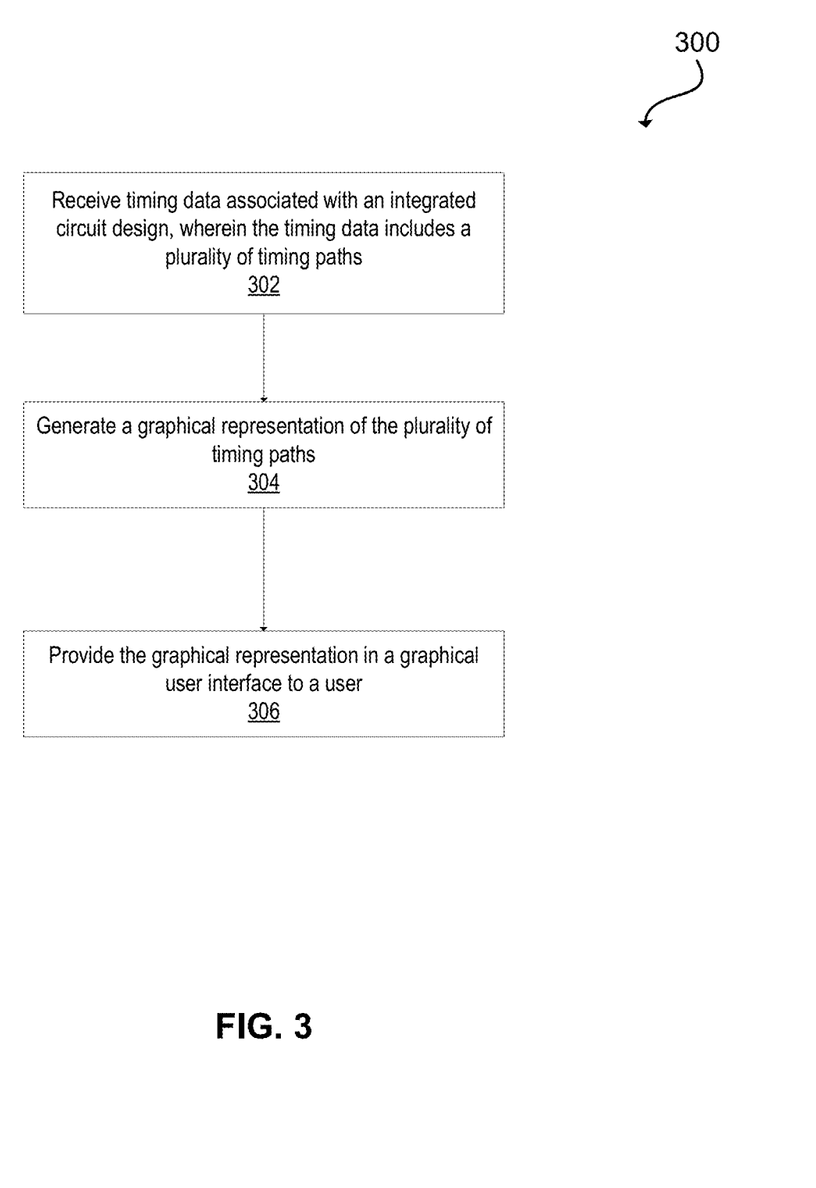
FIG. 3 is a flowchart for a method for visualization of timing paths, in accordance with an embodiment of the present disclosure.

FIG. 3 is a flowchart for a method 300 for visualization of timing paths, in accordance with an embodiment of the present disclosure.

In 302, data associated with an IC design may be acquired. Data may include timing data. The timing data may be generated and/or acquired from a STA tool. The timing data may include information associated with a plurality of timing paths of the IC design.

In some embodiments, the data may be analyzed to determine one or more metrics of the plurality of timing paths. For example, WNS, TNS, and the like may be determined. In some embodiments, the one or more metrics may be included in the timing data and acquired from the STA tool.

In 304, a graphical representation of the plurality of timing paths is generated. The timing path may be represented as a flow ribbon across one or more components of the IC design. A display attribute of the flow ribbon may be indicative of a metric of the timing path.

In some embodiments, a value corresponding to a first dimension may be assigned to each module based on a location of the component in a timing path. A flow number may be assigned to each connection (i.e., between modules). Each component may be displayed vertically in timing flow graph 100 based on the assigned value without overlaps between the components. A dimension of a representation of the component may be based on a maximum of the sum of the sizes of the input and output connections. For example, a component may be represented by a rectangle. A length of the rectangle may be based on the maximum of the sum of the input and output connections associated with the component. In addition, a width of the flow ribbon is based on the number of connections in the associated timing path.

In some embodiments, the component may be aligned to connected components from left to right in the first dimension. The component may be repositioned in a second dimension (e.g., y-coordinate) to remove overlaps and crossings between ribbon flows. The repositioning may be repeated for each value in the first dimension (e.g., x-value). In some aspects, input/output of each component may be ordered based on an identifier associated with the timing path. The identifier may be a unique identifier associated with each timing path. The unique identifier may identify the timing path as it flows through the modules (e.g., through pins of the cells). As described previously herein, each timing path may represent a list of pins. Each pin may be an input or an output from a cell. In some embodiments, edges of the component representation are centered such that an input edge y-coordinate center matches an output edge y-coordinate center.

In 306, the graphical representation is provided in a GUI to a user. For example, the graphical representation may be presented to a display of a user device.

Figure 4:
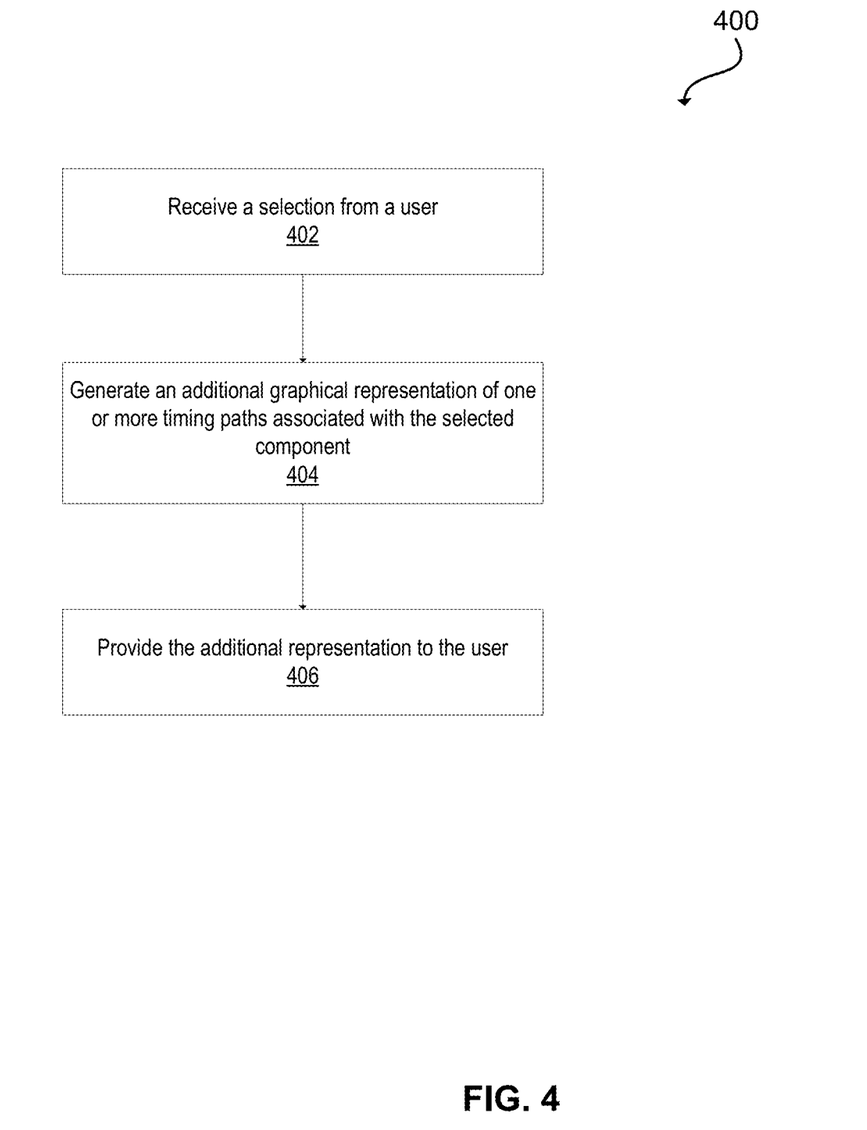
FIG. 4 is a flowchart for a method for visualization of detailed connections of a module, in accordance with an embodiment of the present disclosure.

FIG. 4 is a flowchart for a method 400 for visualization of detailed connections of a component, in accordance with an embodiment of the present disclosure.

In 402, a query to generate and view a module (i.e., component) focused flow graph (i.e., an additional graphical representation) may be received from a user. The query may be in the form of selecting a component in timing flow graph 100, entering a component name, selecting a component in the layout view, entering a search criteria in a search field, or the like.

In 404, a focused flow graph may be generated based on the query received from the user. In some embodiments, all timing paths associated with the selected component may be identified. The timing paths that are not associated with the selected component may not be displayed. The timing paths that are associated with the selected component may be represented as ribbon flow in the focused flow graph. Thus, one or more inputs and one or more outputs of the selected component are identified in the focused flow graph. In some embodiments, the flow ribbon may be reordered to remove overlaps.

In 406, the focused flow graph may be presented to the user in a new visualization window.

Figure 5:
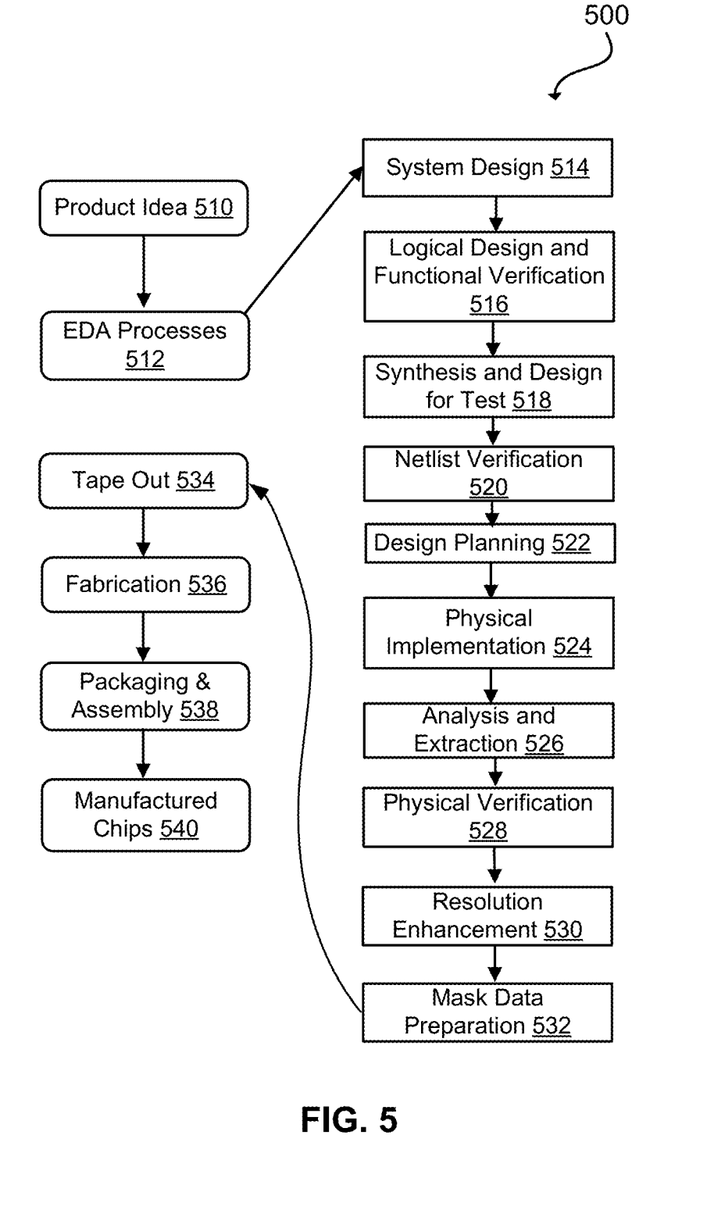
FIG. 5 depicts a flowchart of various processes used during the design and manufacture of an integrated circuit in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described may be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Figure 6:
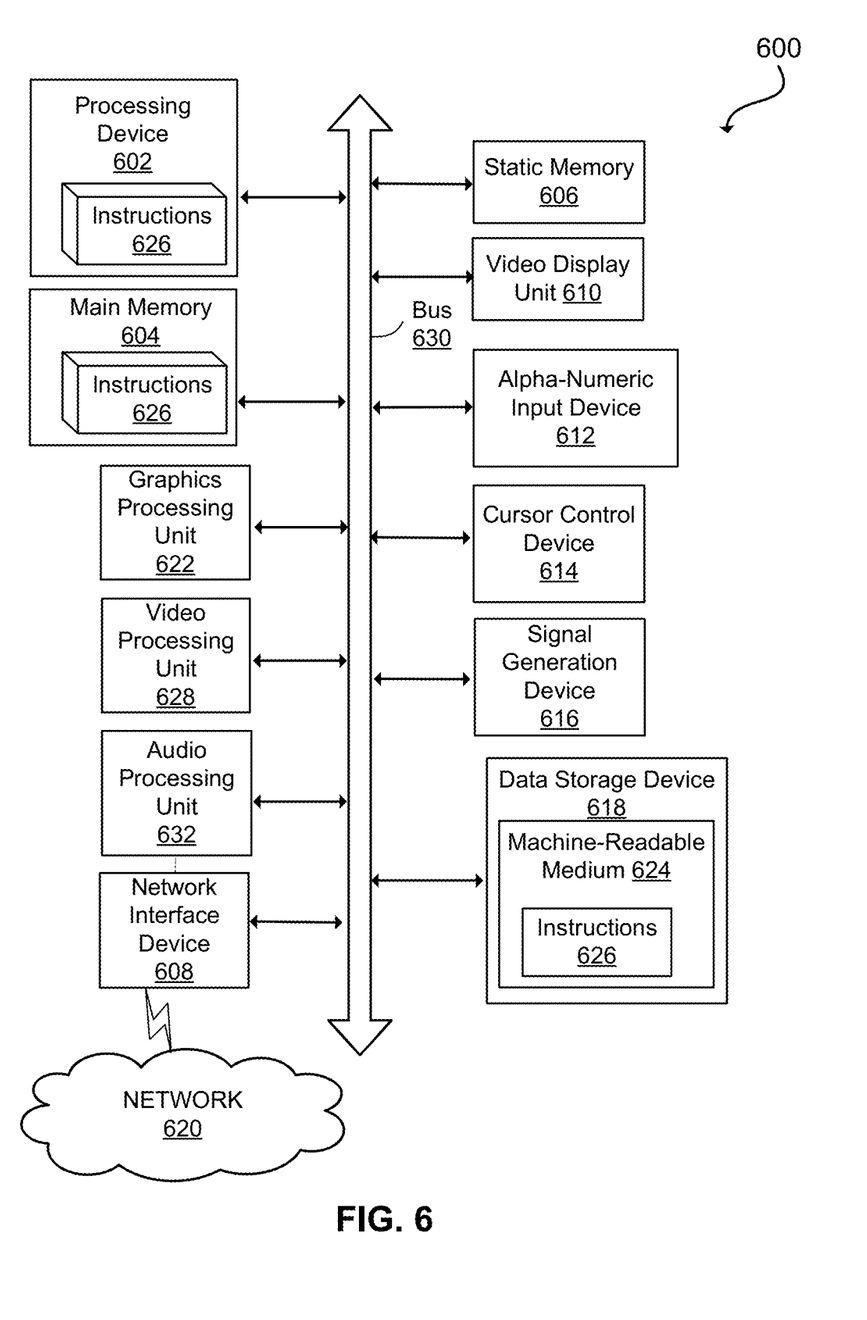
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those that physically manipulate physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   receiving timing data associated with an integrated circuit (IC) design, wherein the timing data includes a plurality of timing paths;
   generating, by a processor, a graphical representation of the plurality of timing paths as a plurality of corresponding flow ribbons, wherein a timing path of the plurality of timing paths is represented as a flow ribbon of the plurality of corresponding flow ribbons across one or more components of the IC design and wherein a display attribute of the flow ribbon is indicative of a metric of the timing path; and
   providing the graphical representation in a graphical user interface (GUI) to a user.

2. The method of claim 1, further comprising:
   configuring a width of the flow ribbon based on a number of connections in the timing path.

3. The method of claim 1, wherein the metric includes a worst negative slack, a total negative slack, or a number of violating paths.

4. The method of claim 1, wherein a first dimension of the graphical representation corresponds to a connection level, and wherein generating the graphical representation of the timing data further comprises:
   arranging a component of the IC design in the first dimension of the graphical representation based on a location of the component in the timing path.

5. The method of claim 1, wherein generating the graphical representation of the plurality of timing paths further comprises:
   assigning a first value corresponding to a connection level in the timing path to a component of the IC design;
   representing the component of the IC design in a second dimension in the graphical representation;
   aligning the component to associated connected components in the timing path; and
   repositioning the component in the second dimension to remove one or more overlaps in a representation of the components.

6. The method of claim 5, further comprising:
   repeating the aligning and the repositioning for each connection level in a first dimension.

7. The method of claim 1, further comprising:
   modifying a display attribute associated with a component of the one or more components in response to a user input.

8. The method of claim 1, further comprising:
   generating additional graphical representation in response to a user selecting a component in the graphical representation, wherein the additional graphical representation includes an input connection and an output connection of the selected component.

9. The method of claim 8, wherein generating the additional graphical representation comprises:
   identifying one or more timing paths associated with the selected component;
   displaying the identified timing paths as ribbon flows in the additional graphical representation; and
   providing the additional graphical representation in another GUI to the user.

10. The method of claim 9, further comprising:
    reordering the one or more ribbon flows in a second dimension of the additional graphical representation to remove overlaps between components.

11. A system comprising:
    a memory storing instructions; and
    a processor, coupled with the memory and to execute the instructions, the instructions when executed cause the processor to:
    receive timing data associated with an integrated circuit (IC) design, wherein the timing data includes a plurality of timing paths;
    generate a graphical representation of the plurality of timing paths as a plurality of corresponding graphical objects, wherein a timing path of the plurality of timing paths is represented as a graphical object of the plurality of corresponding graphical objects across one or more components of the IC design and wherein a display attribute of the graphical object is indicative of a metric of the assign a first value corresponding to a connection level in the timing path to a component of the IC design;

represent the component of the IC design in a second dimension in the graphical representation;

align the component to associated connected components in the timing path;

reposition the component in the second dimension to remove one or more overlaps in a representation of the components; and provide the graphical representation in a graphical user interface (GUI) to a user.

12. The system of claim 11, wherein the processor is further configured to:

configure a width of the graphical object based on a number of connections in the timing path.

13. The system of claim 11, wherein the metric includes a worst negative slack, a total negative slack, or a number of violating paths.

14. The system of claim 11, wherein a first dimension of the graphical representation corresponds to a connection level, and wherein the processor is further configured to:

arrange a component of the IC design in the first dimension of the graphical representation based on a location of the component in the timing path.

15. The system of claim 11, wherein the processor is further configured to:

repeat the aligning and the repositioning for each connection level in a first dimension.

16. The system of claim 11, wherein the processor is further configured to:

modify a display attribute associated with a component of the one or more components in response to a user input.

17. The system of claim 11, wherein the processor is further configured to:

generate an additional graphical representation in response to a user selecting a component in the graphical representation, wherein the additional graphical representation includes an input connection and an output connection of the selected component.

18. The system of claim 17, wherein the processor is further configured to:

identify one or more timing paths associated with the selected component; displaying the identified timing paths as graphical objects in the additional graphical representation; and provide the additional graphical representation in another GUI to the user.

19. A non-transitory computer readable medium comprising stored instructions, which when executed by a processor, cause the processor to:

receive timing data associated with an integrated circuit (IC) design, wherein the timing data includes a plurality of timing paths;

generate a graphical representation of the plurality of timing paths as a plurality of corresponding flow ribbons, wherein a timing path of the plurality of timing paths is represented as a flow ribbon of the plurality of corresponding flow ribbons across one or more components of the IC design and wherein a display attribute of the flow ribbon is indicative of a metric of the timing path; and provide the graphical representation in a graphical user interface (GUI) to a user.

* * * * *

UNITED STATES PATENT AND TRADEMARK OFFICE
CERTIFICATE OF CORRECTION

| | | |
|---|---|---|
| PATENT NO. | : 12,229,484 B1 | Page 1 of 1 |
| APPLICATION NO. | : 17/535040 | |
| DATED | : February 18, 2025 | |
| INVENTOR(S) | : Oliver Kozber et al. | |

It is certified that error appears in the above-identified patent and that said Letters Patent is hereby corrected as shown below:

In the Claims

In Column 13, Line 1, in Claim 11, after "the" insert -- timing path; --.

Signed and Sealed this
Fifth Day of August, 2025

Coke Morgan Stewart
*Acting Director of the United States Patent and Trademark Office*